UNITED STATES PATENT OFFICE 2,464,741

POLYMER OF ALLYL GLYCOLATE AND PROCESS OF MAKING SAME

David E. Adelson and Hans Dannenberg, Berkeley, Calif., assignors to Shell Development Company, San Francisco, Calif., a corporation of Delaware No Drawing. Application April 15, 1946, Serial No. 662,416

6 Claims. (Cl. 260—78.3)

This invention relates to a class of useful new polymers and to a method for manufacturing them. More particularly, the invention pertains to polyallyl esters of hydroxy-substituted monocarboxylic acids.

Diallyl esters of dicarboxylic acids can be subjected to polymerization treatment whereby polymers of the esters are obtained. However, monomers of such esters contain two polymerizable unsaturated groups, i. e. two allyl groups, and consequently, they polymerize to form three-dimensional cross-linked polymers which are characterized by being insoluble in all solvents as well as being infusible. These insoluble and infusible polymers have no utility in applications where further processing of the polymer is desired because of the inability to dissolve them in solvents and subject them to further reaction treatment. On the other hand, compounds which contain but a single polymerizable unsaturated group do not form three-dimensional cross-linked polymers upon being polymerized; rather, they form only linear polymers which are characterized by being soluble in a variety of common solvents as well as being fusible, i. e. capable of being melted when heated. The properties of solubility and fusibility possessed by linear polymers of the compounds containing only a single polymerizable unsaturated group enable them to be subjected to further treatment and reaction so as to produce highly useful products. Moreover, the linear polymers are useful in themselves without further treatment owing to their properties of solubility and fusibility.

Allyl esters are extremely resistant to polymerization treatment in comparison with other compounds containing a polymerizable unsaturated group. For example, vinyl acetate will form a polymer upon addition of a polymerization catalyst like benzoyl peroxide in a short time even at room temperature (20° C.). The corresponding allyl ester, i. e. allyl acetate, can have benzoyl peroxide added thereto and permitted to remain at room temperature for practically indefinite periods of time without appreciable polymerization occurring. In our copending application, Serial No. 417,278, filed October 31, 1941, and now abandoned, of which the present application is a continuation-in-part, we have described a method whereby polymerization of allyl acetate and similar singly unsaturated compounds can be effected. As disclosed therein, we discovered that by heating liquid allyl acetate for rather extended periods of time at elevated temperatures of 50° C. to 250° C. in the presence of peroxides or gases containing oxygen, polymerization of the allyl acetate occurred and polyallyl acetate was produced. Besides being catalysts which are capable of effecting the polymerization reaction, the substances used in the treatment such as benzoyl peroxide or air, are also known to be powerful oxidizing agents. A compound like allyl acetate is not particularly susceptible to oxidation owing to its stable chemical structure. Treatment of it at elevated temperature in the presence of a peroxide or gaseous oxygen should not, and in fact does not, cause oxidation thereof, at least to any appreciable extent. The situation is quite different with respect to allyl esters of hydroxy-substituted monocarboxylic acids of which allyl glycolate is typical. Allyl glycolate contains a hydroxy group and the compound is therefore quite susceptible to oxidation owing to the presence of this labile hydroxy group. Treatment of allyl glycolate with oxidizing agents like peroxides or air, especially at elevated temperatures, should cause oxidation of the compound to occur so that the labile hydroxy group is converted to an aldehyde or carboxyl group. It was therefore entirely unexpected when we discovered that allyl glycolate could be heated at elevated temperatures in the presence of benzoyl peroxide or air and polyallyl glycolate produced with no material oxidation of the compound having occurred.

The compounds which are polymerized in the process of the present invention are preferably allyl esters of saturated aliphatic monocarboxylic acids of 2 to 6 carbon atoms containing a hydroxyl group as alpha substituent therein. Reference is made, for example, to allyl esters of glycolic acid, lactic acid, alpha-hydroxy-n-butyric acid, alpha-hydroxyisobutyric acid, alpha-hydroxy-n-valeric acid, alpha-hydroxyisovaleric acid, alpha-hydroxy-n-caproic acid, alpha-hydroxydiethylacetic acid, alpha-hydroxymethylisopropylacetic acid, and the like. Although it is preferred to polymerize unsaturated esters of the foregoing hydroxy-substituted acids, polymerization can be effected with the esters of other saturated aliphatic acids containing one or more hydroxy groups and, if desired, the hydroxy group or groups can be linked to the other carbon atoms of the acid than the alpha carbon atom. For example, polymerization can be effected with allyl esters of such acids as alpha-hydroxy-n-caprylic, alpha-hydroxydi-isopropylacetic, di-isobutylglycolic, methylnonylglycolic, alpha-hydroxylauric, alpha-hydroxymyristic, alpha-hydroxypalmitic, alpha-hydroxy-stearic, hydracrylic, beta-hydroxybutyric, beta-hydroxy-n-valeric, beta-hydroxy-isocaproic, gamma-hydroxyvaleric, epsilon-hydroxycaproic, 10-hydroxyundecylic, 9-hydroxystearic, 13-hydroxybehenic, dihydroxypropionic, beta,gamma-dihydroxybutyric, gamma,delta-dihydroxyvaleric, dihydroxystearic, erythroglucic, apionic and the like as well as their homologues.

These allyl esters polymerize at a reasonably rapid rate in the process of the invention. However, the corresponding esters of other unsaturated alcohols of the same type can also be used although polymerization of them, in general, is slower and more difficult. These alcohols are monoolefinic monohydric compounds, all of which contain the aliphatic olefinic double-bonded linkage between the second and third carbon atoms from the oxygen atom of the hydroxy group therein. In other words, the alcohols have an olefinic linkage between two aliphatic carbon atoms one of which is directly linked to the saturated carbon atom having the hydroxy group linked directly thereto. These alcohols can be either primary, secondary or tertiary alcohols and they contain 3 to 10 carbon atoms. The alcohols may also be turned beta, gamma-monoolefinic monohydric alcohols in that they contain the aliphatic olefinic linkage between the beta and gamma carbon atoms with respect to the alpha carbon atoms to which the hydroxy group is directly linked. Of the generic class of alcohols employed in the form of their esters with the hydroxy-substituted acids, it is preferred that the gamma or third carbon atom from the oxygen atom of the hydroxy group be the carbon atom of a terminal methylene group as is the case in such representative alcohols as allyl, methallyl, beta-ethallyl, methyl vinyl carbinyl, ethyl vinyl carbinyl, dimethyl vinyl carbinyl, beta-isopropyl allyl, beta-hexyl allyl, pentyl vinyl carbinyl, phenyl vinyl carbinyl, beta-phenyl allyl, tolyl vinyl carbinyl, beta-cyclohexyl allyl, and the like. If desired, the esters of other less preferred alcohols of the class can be used such as, for example, crotyl alcohol, tiglyl alcohol, angelyl alcohol, cinnamyl alcohol, hexen-2-ol-1, octen-2-ol-1, decen-2-ol-1, hexen-3-ol-2, hexen-4-ol-3, cyclohexen-2-ol-1, and the like. Esters of the aliphatic unsaturated alcohols are most desirable, but those containing aryl and/or alicyclic radicals, e. g. tolyl, cyclohexyl and cyclopentyl, as additional substituents can also be used. If desired, the esters of halogen-substituted alcohols can also be employed such as beta-chlorallyl alcohol, gamma-chlorallyl alcohol, beta-bromallyl alcohol, chlorocrotyl alcohol, 3-chorbuten-2-ol-1 and the like.

In order to obtain the linear polymers of the invention, the unsaturated esters are heated in the presence of an oxygen-containing polymerization catalyst having an oxygen atom linked directly to another oxygen atom. Gases which contain oxygen such as air can be used for this purpose or, if desired, substantially pure oxygen is suitable as well as oxygen in admixture with diluents like nitrogen, carbon dioxide or methane. Peroxide polymerization catalysts are very suitable such as benzoyl peroxide, hydrogen peroxide, barium peroxide, sodium peroxide, olefin peroxide, lauryl peroxide, benzoyl acetyl peroxide, acetone peroxide, etc. Tertiary alkyl peroxides are particularly preferred in view of their high catalytic activity and these peroxides include such compounds as, for example, tertiary butyl hydroperoxide, di(tertiary butyl) peroxide, di(tertiary amyl) peroxide, and tertiary butyl perbenzoate. Other oxygen-yielding compounds can be employed as catalysts such as an alkali metal persulfate or perborate.

Elevated temperatures are necessary in order to effect the desired polymerization. The ester in the presence of the polymerization catalyst is heated at about 50° C. to 250° C. and in some cases up to 300° C. or even higher. However, temperatures so high that appreciable decomposition of the ester or its polymer are, of course, to be avoided. The rate of polymerization at lower temperatures such as from 50° C. to 100° C. is comparatively slow although with catalysts like benzoyl peroxide which are subject to extensive decomposition at higher temperatures, it is desirable to employ a temperature within this lower range. The tertiary alkyl peroxides are quite stable at such higher temperatures and by employing a range of say 100° C. to 250° C., 150° C. to 225° C. being particularly suitable, with a catalyst of this type, e. g. di(tertiary butyl) peroxide, the polymerization can be effected at a rapid rate. The concentration of catalyst can be varied over considerable limits and it seems in general that larger amounts of catalyst give faster rates of polymerization. However, this effect is to some extent limited because above about 10%, the increase in rate with increased catalyst concentration is not so marked as at lower amounts of the oxygen-yielding compounds. The use of excessive amounts of polymerization catalyst is therefore uneconomical. In general, the use of about 0.1% to 5% polymerization catalyst is suitable and about 1% to 2% is preferred.

To effect the addition polymerization reaction, the oxygen-containing catalyst is, of course, the sole catalytic agent present in the polymerizing mixture. The polymerization appears to occur in the liquid phase and the pressure of operation is therefore regulated in conjunction with the temperature so that at least part of the ester is in liquid phase, i. e. where necessary sufficiently high pressure is employed so that all or part of the ester is maintained in liquid phase. With peroxide catalysts like benzoyl peroxide, which are subject to considerable decomposition at temperatures above 100° C., the polymerization can be effected by adding additional catalyst from time to time or continuously in order that the polymerizing ester will always have the polymerization catalyst present. If desired, of course, the temperature may be maintained below that at which appreciable decomposition of the catalyst occurs. In any event, it is essential that the catalyst be present with liquid reactant to enable the polymerization to proceed at an appreciable rate.

As noted, the polymerization may be effected in the presence of a molecular-oxygen-containing gas. When such a gas is employed as catalyst, it is ordinarily desirable to operate at temperatures from about 100° C. to 200° C. In this case, the ester is heated and a molecular-oxygen-containing gas such as air is brought into intimate contact with the liquid ester as by dispersing the gas into and through the reaction mixture in the form of fine bubbles.

The process of the invention may be executed in a variety of manners. In general, it is preferable to conduct the polymerization in a closed vessel equipped with heating means. When a non-gaseous catalyst is employed, the catalyst is mixed with the ester and the mixture is heated for a time sufficient to effect the appreciable polymerization of the ester. In cases where a gaseous catalyst is used, the gas is bubbled or dispersed through the heated liquid ester and is recycled through the ester, or if desired, discharged to the atmosphere. It is usually desirable in discharging gaseous catalyst, to provide passage of the gas through some recovery means such as a condenser in order to remove ester which is carried with the gas as vapor. The time required to effect the polymerization will vary to considerable extent depending upon the particular ester, the catalyst and the temperature of operation. It has been found in polymerizing the esters that the rate of polymerization is fairly rapid at first but, as the monomeric ester is diluted with polymer, the rate decreases. In general, the polymerization is conducted for a time sufficient to effect appreciable polymerization, i.e. until at least 10% of the ester has been converted to polymer.

The time necessary to convert a given proportion of polymer will vary considerably with the particular ester, the catalyst and its concentration, the temperature and other reaction variables. The time required to obtain a desired proportion of polymer is readily determined by trial under the chosen reaction conditions wherein samples are withdrawn and the refractive index thereof measured after which the sample is subjected to a rapid distillation under vacuum of 1 to 2 mm. to remove monomer and determine the polymer content thereof. Since the refractive index of the monomer-polymer mixture increases with increasing polymer content, a correlation can be made between time of treatment, refractive index and the conversion to polymer. By use of the correlation, the time necessary for a desired conversion can be predicted or by measuring the refractive index of a polymerizing ester, the polymer content can be estimated.

While it is usually preferable to use substantially pure ester, it may in some cases be desirable to effect the polymerization in an inert solvent, especially in those cases where the ester is a solid material at the temperature of operation. Various hydrocarbons are particularly suited for this purpose such as benzene, toluene, naphtha and the like. Many of the esters are high boiling liquids and they can be polymerized at normal atmospheric temperature by refluxing in the presence of the polymerization catalyst.

In polymerizing the esters, the polymerization reaction is ordinarily stopped before all the monomer has been converted to polymer. The unreacted monomer is then recovered from the reaction mixture, preferably by distillation or evaporation. Other methods, such as extraction or the like, can be used to separate the monomer from the polymer. The recovered unreacted monomer may be re-utilized in further polymerization operations.

For the purpose of illustrating in some detail the application of the invention as described above, the following examples are given, although it is to be understood that these are in no way to be construed as limiting the invention with respect to reactants, catalysts or mode of operation.

Example I

Allyl glycolate was heated at 120° C. to 130° C. while blowing a slow stream of air through it at a rate of about 4–5 bubbles per minute. After 122.5 hours, a viscous oil was obtained. The treatment caused the refractive index ($n_D^{20}$) to increase from 1.4426 to 1.4958. The polymeric mass was soluble in acetone and no precipitation occurred upon addition of water to the acetone solution. The mass was also slightly soluble in methyl alcohol although it was insoluble in ethyl alcohol. The polymer was slightly soluble in cold water and much more so in hot. A clear, hot aqueous solution becomes cloudy on cooling, but no precipitation occurs.

Example II

About 207 g. of allyl glycolate was heated at reflux (180° C.) for about 30 minutes and the refractive index ($n_D^{20}$) was increased 0.0005 unit. To this material was then added a solution of 2.5 g. of di-(tertiary butyl) peroxide in 43 g. of ester so that the complete solution contained about 1% of peroxide polymerization catalyst. This was then heated at reflux while taking measurements of the refractive index at intervals with the follow results:

| Time, minutes | $n_D^{20}$ |
| --- | --- |
| 0 | 1.4449 |
| 7 | 1.4534 |
| 17 | 1.4621 |
| 32 | 1.4689 |
| 47 | 1.4712 |
| 65 | 1.4730 |
| 80 | 1.4737 |

The monomer-polymer mixture was distilled rapidly from a Claisen flask, first removing the bulk of the monomer at atmospheric pressure and then reducing the pressure to 1–2 mm. for removal of the remainder of the monomer. The distillation showed that about 54% of the allyl glycolate was converted to polymer. The polymer was a clear, colorless, very viscous, water-soluble material. The analysis given below indicates that it contained an average of about 5.4 monomer units in the molecule from the molecular weight determination made ebulliscopically in ethyl alcohol.

| | Found | Theoretical |
| --- | --- | --- |
| Ester value, equiv. per 100 g | 0.879 | 0.861 |
| Acid value, equiv. per 100 g | 0.008 | 0.0 |
| Acetyl value, equiv. per 100 g | 0.620 | 0.861 |
| Molecular weight | 630 | $(116)_n$ |

Example III

About 81 g. of allyl lactate was refluxed at 177° C. for about 75 minutes during which time measurements of the refractive index indicated that only very slight polymerization had occurred. Then about 1 g. of di-(tertiary butyl) peroxide dissolved in 19 g. of allyl lactate was added to the refluxing ester whereupon after an additional 45 minutes the heating was discontinued. The mixture was then distilled to remove unreacted monomer and it was found that a conversion to polymer of about 41% had occurred. The polymer was a colorless, water-soluble material which was very viscous. Analysis of the polymer is given in the table following.

| | Found | Theoretical |
| --- | --- | --- |
| Refractive index, 20/D | 1.4863 | |
| Ester value, equiv. per 100 g | 0.748 | 0.769 |
| Acetyl value, equiv. per 100 g | 0.655 | 0.769 |
| Acid value, equiv. per 100 g | 0.0046 | 0 |
| Mol. wt., ebul. in MEK | 550 | $(130)_n$ |

Example IV

Allyl glycolate containing about 1.6% di-(tertiary butyl) peroxide was refluxed at about 180° C. for 1 hour. The polymeric mixture was distilled to remove monomer and about 76.5% of polyallyl glycolate was recovered. The polyallyl glycolate was a very viscous material having a viscosity greater than 1000 poises by the Young-McCardle standards and a substantially water-white color of less than 1 by the Gardner color scale.

Example V

Allyl lactate was refluxed at about 174° C. in the presence of 1% di-(tertiary butyl) peroxide for about 40 minutes. Distillation of the monomer-polymer mixture for removal of the monomer indicated a conversion of 39.2% to polyallyl lactate. The polyallyl lactate was a very viscous material which was substantially water-white in having a color of less than 1 by the Gardner color scale.

The novel linear polymers of the invention are very useful substances. They can be employed as plasticizers and softeners for various plastic materials such as cellulose derivatives like nitrocellulose, cellulose acetate, etc., as well as for synthetic resins and rubber. Since they are soluble in various common materials, and since the polymer molecules contain in general about 4 to 20 monomer units, they are particularly useful as intermediates in the synthesis of other materials. One of these uses is the preparation of the polymeric alcohols by hydrolysis of the polymeric esters of the invention without use of any saponification agent or catalyst. For some unexpected, but highly advantageous reason, the polymeric esters rapidly hydrolyze when placed in contact with water alone and no catalyst such as sulfuric acid or sodium hydroxide is needed to effect the hydrolysis reaction. This is surprising in view of the comparative stability against hydrolysis in heated water of corresponding polymeric esters devoid of the hydroxy substituent. The unexpected property of the polymers of the invention will be evident from the following example.

Example VI

About 32 g. of polyallyl glycolate prepared as directed in Example II was mixed with 150 g. of water maintained at about 100° C. The polymer was hydrolyzed about 15% in an hour, 68% in three hours, and was completely hydrolyzed in five and one-half hours. The solution was made basic with lime, filtered, evaporated and the residue extracted with absolute alcohol. The solution was then treated with ion-exchange resin to remove traces of calcium contained therein after which it was evaporated leaving 17 g. of light yellow, very viscous, water-soluble, polyallyl alcohol. While lime was used to remove the liberated glycolic acid, it could have been separated by distillation or use of the ion-exchange resin alone.

Polyallyl acetate does not hydrolyze in this ready manner. About 25 g. of polyallyl acetate was mixed with 100 g. of water in a sealed glass tube. After four and one-half hours heating at 100° C. the extent of hydrolysis is unmeasurable. Upon heating another sample in the same proportions at the higher temperature of 170° C. for four to five hours, hydrolysis to only 1.1% had occurred which is quite different from the 100% hydrolysis at the lower temperature of 100° C. when polyallyl glycolate was treated in corresponding manner.

The presence of the hydroxy groups in the polymers of the invention also make them suitable for use in preparing alkyd resins therefrom by reaction with dicarboxylic acids or anhydrides. This will be evident from the following example.

Example VII

About 22 g. of polyallyl glycolate was heated with about 14 g. of phthalic anhydride in a stream of carbon dioxide at 170° C. to 190° C. After one and one-half hours the acid number of the mixture was 167 mg. KOH per g., and after two hours at 225° C. the mixture was converted to a rubbery gel.

The foregoing description of the invention has been concerned with polymerization and polymers from the unsaturated alcohol esters of aliphatic hydroxy-substituted monocarboxylic acids. We have also discovered that the corresponding unsaturated alcohol esters of hydroxy-substituted aromatic and alicyclic monocarboxylic acids can be polymerized to useful polymers by the method of the invention. Even though the allyl and related esters are quite resistant against polymerization, such esters of the hydroxy-substituted aromatic and alicyclic monocarboxylic acids can be polymerized. In spite of the fact that the hydroxy group is directly linked to the aromatic nucleus in the esters of hydroxy-substituted aromatic acids so that the ester is a derivative of phenol and phenols are known to be effective in preventing polymerization even when present in small amounts, we discovered quite unexpectedly that the esters could be polymerized. This is illustrated in the following example.

Example VIII

A quantity of allyl salicylate was heated for about 75 hours at 130° C. while bubbling a slow stream of air therethrough. The final mixture of monomer and polymer was very viscous, the mixture freed of monomer giving an extremely viscous, semi-solid material.

Other members of such non-aliphatic esters can be polymerized using the conditions and catalysts described heretofore. Reference is made to the allyl and related beta, gamma-monolefinic alcohol esters of such acids as salicyclic, m-hydroxybenzoic, p-hydroxybenzoic, p-methyl-o-hydroxy benzoic, o-methyl-m-hydroxy benzoic, p-hydroxyphenylacetic, p-hydroxyhydratropic, 3,4-dihydroxy benzoic, di-hydroxytoluic, hydroumbellic, p-hydroxyphenyl-o-benzoic, 2,3-naphtholcarboxylic, and the like. If desired, esters of hydroxy-substituted saturated alicyclic monocarboxylic acids can be used like, for example, the unsaturated alcohol esters of acids like hexahydrosalicylic, hexahydro-m-hydroxybenzoic, 4-methyl-4-hydroxycyclohexanecarboxylic, hexahydrodihydroxybenzoic, hexahydromandelic, and the like.

The polymers of the esters of aromatic acids having a hydroxy substituent linked directly to the aromatic nucleus are unique because they have acidic properties. Such acidic properties are possessed from the phenolic hydroxy group contained in the polymers. This gives them ion-exchange properties which are not possessed by other polymers of the invention which contain aliphatic hydroxy substituents.

Broadly, our invention is concerned with polymerization of and polymers from allyl and the related unsaturated alcohol esters of monocarboxylic acid containing a hydroxy group linked directly to a carbon atom having also linked directly thereto only carbon and hydrogen atoms.

Furthermore, the ester contains but a single polymerizable group having a multiple linkage between two vicinal aliphatic carbon atoms. The only group present in the esters capable of addition polymerization is contained in the alcohol portion of the esters. This lack of a plurality of such polymerizable groups enables the desired linear polymers to be obtained. The monomeric esters polymerized by the method of the invention are prepared by esterifying the unsaturated alcohol with the hydroxy-substituted acid in conventional fashion, preferably employing toluene sulfonic acid as catalyst.

The foregoing description has emphasized production of homopolymers, i. e. polymerization of the ester as sole polymerizable constitutent in the composition subjected to polymerization treatment although it will also contain the catalyst and, if desired, diluents. If desired, copolymers can be prepared from mixtures of the esters or from the unsaturated ester in admixture with another compound containing a polymerizable group such as those containing the $CH_2=C$ or vinylidene group like in butadiene-1,3, vinyl acetate, diallyl phthalate, methyl methacrylate, allyl acetate, acrylonitrile, etc.

We claim as our invention:

1. A process for the production of polyallyl glycolate which comprises heating allyl glycolate in liquid phase at 50° C. to 250° C. in the presence of a peroxide polymerization catalyst.

2. A process for the production of polyallyl glycolate which comprises heating allyl glycolate in liquid phase at 50° C. to 250° C. while bubbling gaseous oxygen therethrough for a time sufficient to effect substantial polymerization of the ester.

3. A process for the production of polyallyl glycolate which comprises heating allyl glycolate in liquid phase at 50° C. to 100° C. in the presence of benzoyl peroxide for a time sufficient to convert a substantial amount of the ester into polymer.

4. Polyallyl glycolate.

5. A process for the production of polyallyl glycolate which comprises heating allyl glycolate in liquid phase at 50° C. to 250° C. in the presence of an oxygen-containing polymerization catalyst having an oxygen atom linked directly to another oxygen atom.

6. A process for production of polyallyl glycolate which comprises heating allyl glycolate in liquid phase at 120° C. to 130° C. while bubbling air therethrough for a time sufficient to effect substantial polymerization of the ester.

DAVID E. ADELSON.
HANS DANNENBERG.

REFERENCES CITED

The following references are of record in the file of this patent:

UNITED STATES PATENTS

| Number | Name | Date |
|---|---|---|
| 2,164,188 | Groll et al. | June 27, 1939 |
| 2,332,900 | D'Alelio | Oct. 26, 1943 |
| 2,374,081 | Dean | Apr. 17, 1945 |